Dec. 30, 1930.   J. H. HUNT   1,787,074
DISK WHEEL MOUNTING
Filed Sept. 14, 1926
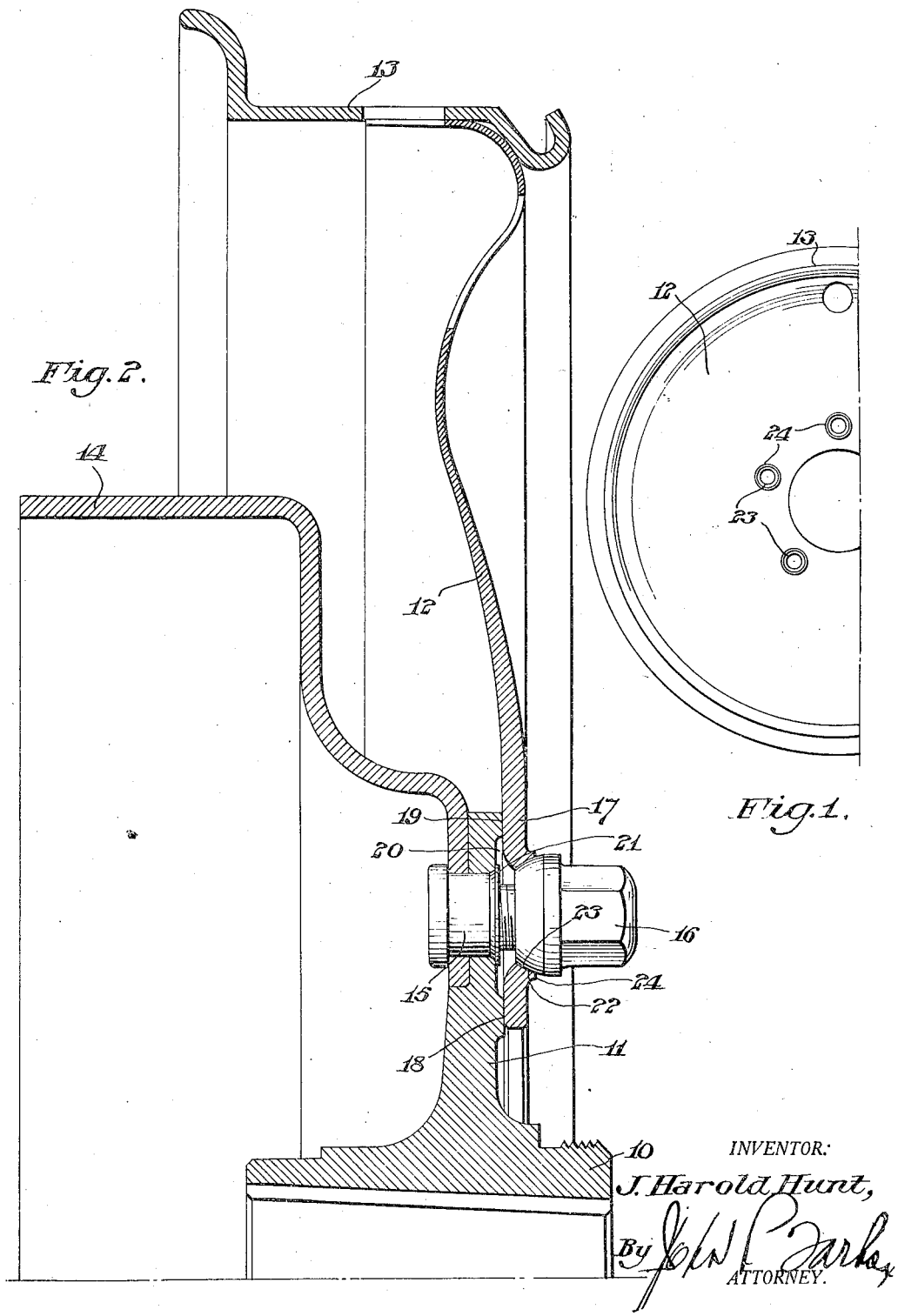
INVENTOR:
J. Harold Hunt,
By
ATTORNEY.

Patented Dec. 30, 1930

1,787,074

UNITED STATES PATENT OFFICE

J HAROLD HUNT, OF DETROIT, MICHIGAN, ASSIGNOR TO BUDD WHEEL COMPANY, OF PHILADELPHIA, PENNSYLVANIA, A CORPORATION OF PENNSYLVANIA

DISK-WHEEL MOUNTING

Application filed September 14, 1926. Serial No. 135,314.

My invention relates to demountable wheels and more particularly to such wheels having a central body portion of relatively thin metal secured by axially extending securing means to a radial hub flange.

In demountable wheels of this class it has heretofore been the practice, in some cases, to form the central portion of the wheel body with an annular rib partly for strengthening purposes and partly for ease of assembly on the hub and for other reasons not necessary to enumerate here. Such annular rib provided two spaced surfaces on the wheel body which seated on corresponding spaced bearing surfaces on the hub and between said spaced bearing surfaces on hub and wheel body these members were each provided with an annular series of holes, the holes of the two series arranged in axial alignment, and each aligned pair of holes provided with securing means, such as bolting means, either studs and nuts or headed studs. To provide an extensive bearing for the nuts or headed studs on the wheel body, the metal surrounding the holes was coined inwardly to form concave sockets and the nuts or the heads of the headed studs were formed with mating convex bosses. Since the holes in the wheel body were made substantially larger in diameter than the shank of the studs, the securing means had not merely a securing function, but also a centering and driving function through the extensive bearing surfaces between the coined holes and bosses on the nuts or headed studs. The tightening of the nuts or studs automatically acted to center the wheel and also tended to spring the spaced wall of the annular rib inwardly toward the hub flange, thereby placing the metal in tension and providing a lock washer action to hold the securing means in place. The nuts were also, in some cases, made self-tightening by making the threads of the studs of the same hand as the side of the vehicle on which they were used.

It is with this class of wheels that my invention has to do. The prime object of my invention is to simplify the hub structure of wheels of this class and thereby make their manufacture easier and lower the cost of production. I attain this object by making the metal central portion of the wheel relatively plain, i. e., with no deep drawing or stamping operations, and in shaping the hub flange with radially spaced bearing zones between which the hub has an annular recess of substantial width adapted to be bridged by the wheel body.

To readily form concave sockets in the wheel body to receive the correspondingly convex bosses on securing nuts or studs, I coin the metal of the wheel body surrounding the holes for receiving the securing studs and nuts, outwardly. By so coining the holes outwardly, I have found that I am able to very readily obtain a concave seat to fit the convex bosses on nuts or studs by a relatively shallow coining operation as compared with the prior practice of coining inwardly, I am also able to attain this concave seat with comparatively little machining.

The spaced shoulders on the hub flange can readily be formed in the forging or other operation when forming the hub and only the seating surfaces formed thereby need to be machined surfaces. The recess in the hub between the seating surfaces permits the portion of the wheel body opposite the same to be sprung slightly when the securing means are tightened, to permit this portion of the wheel body to act as a lock washer.

A minor object of my invention is the efficient securing of the brake drum and wheel body to the hub flange with a minimum of securing means, and I attain this object by utilizing the same set of securing studs for securing both these members on opposite sides of the hub flange.

Further objects and advantages of my improved construction will appear from the following description when read in connection with the drawings forming a part of this specification. In the drawings I have illustrated one embodiment of my invention, but it will be obvious that the other and modified constructions may likewise attain the objects I attain by this particular embodiment, and I wish it to be understood that such constructions will likewise fall within the spirit and scope of the claim at the end of the specification.

Of these drawings:

Figure 1 is a partial outside elevation of a demountable wheel embodying the invention and Fig. 2 is a section of the wheel body and hub taken through one of the securing studs.

The invention is shown as applied to a rear wheel of a vehicle but it will be understood that it is equally adapted for application to a front wheel.

The body of the hub is represented by the numeral 10, the radial hub flange by numeral 11, and the wheel body in this case a disk body, by numeral 12, the rim secured to its periphery by numeral 13, the brake drum by numeral 14, the securing studs by 15 and the nuts by 16. All of these parts may be, except as hereinafter pointed out to the contrary, of any usual and approved construction. The disk body is preferably, in order to secure strength where it is most needed, namely, at its point of attachment to the hub, and yet retain the desired lightness consistent with safety at the periphery, made of tapered cross section from a point adjacent the center toward the periphery as is clearly shown in the drawings.

In the vicinity of its attachment to the hub, as at 17, the body of the disk is generally plane and extends substantially radially of the axis of the wheel. This portion of the disk seats against the radially spaced annular bearing surfaces 18 and 19 of the hub flange and bridges the annular depression 20 in the hub flange between these surfaces.

The hub flange is provided between these bearing surfaces with an annular series of studs 15 which are adapted to be permanently secured to the hub flange by a riveted over portion intermediate their ends as indicated at 21. In the case of a wheel carrying a brake drum as shown, I prefer to use this same series of studs to secure the brake drum 14 to the hub flange, thereby avoiding the use of a separate series of rivets to secure the brake drum to the hub flange. As shown, the rear portion of the hub flange is provided with an annular recess in which the central radial portion of the brake drum is adapted to seat. The studs being headed on their rear ends are passed through registering holes in the brake drum and hub flange and are then riveted over to draw these parts firmly together and secure the studs in place.

The central portion 17 of the disk is likewise formed with an annular series of holes to loosely receive the projecting reduced screw threaded shanks of the studs, and these holes are provided with concave seats 22 adapted to receive the convex faces 23 on the nuts 16 whereby to center and support the disk wheel body on the hub when the nuts are screwed up. In order to obtain a wider bearing surface between nuts and disk, I prefer to coin the metal of the disk surrounding the holes outwardly to provide annular bosses 24, in which the concave seats 22 are formed.

Since the disk is in the immediate vicinity of the studs and nuts, spaced from the hub flange by reason of the annular recess 20 in the outer face of flange 11, when the nuts 16 are drawn up tight the disk is sprung slightly, so that it acts as a lock washer to prevent loosening of the nuts. The nuts are further prevented from loosening by the self-tightening action due to provision, in some cases, of threads on the studs of the same hand as the side of the vehicle on which they are used.

From the foregoing description it will be obvious that I retain, by my present construction, all the advantages of the earlier construction, and I do this with a construction that is simpler to manufacture and hence results in a lowering of the cost of production. For example, in forming the disk the central annular rib is eliminated. The annular depression in the hub is readily formed in the operation of forging or otherwise forming the hub. By using the same studs to secure the brake drum as the ones used to secure the disk, I avoid additional riveting operations to secure the brake drum.

While I have described a specific embodiment of the invention, it will be understood that such modifications and rearrangement of parts as come within the language and spirit of the appended claim are to be considered as falling within the scope of my invention.

What I claim as new and useful is:

A vehicle wheel comprising in combination a hub, a radial flange on said hub, said radial flange being provided with a pair of spaced annular lands adapted to form bearing surfaces for a wheel body and having an annular depression therebetween, a series of bolts secured to said hub flange within the radial confines of said annular depression, a wheel body in the form of a web plate, said wheel body being provided in its radial portion between said lands with a series of annularly arranged openings adapted to receive said bolts, the openings in said web plate being outwardly coined and provided with concave seats, and a plurality of nuts of considerably smaller diametrical extent than the radial extent of said depression adapted to co-act with said bolts in securing said wheel body and flange in their assembled relationship, said nuts having convex portions adapted to be received in the concave seats in said wheel body, whereby to resiliently clamp said wheel body to said flange.

In testimony whereof I hereunto affix my signature.

J HAROLD HUNT.